United States Patent Office 2,739,973
Patented Mar. 27, 1956

2,739,973

VAT GREY TO BLACK DYES OF THE DIBENZANTHRONE SERIES

David I. Randall, Easton, Pa., and John Taras, Alpha, N. J., assignors to General Aniline & Film Corporation, New York, N. Y., a corporation of Delaware No Drawing. Application June 29, 1953, Serial No. 364,924

11 Claims. (Cl. 260—354)

This invention relates to new valuable vat dyestuffs of the dibenzanthrone series, which dye vegetable fibers desirable bluish-grey shade having good chlorine and light fastness, and to the process of preparing the same.

We have found that new and valuable vat dyes of the dibenzanthrone series from which vat grey to black dyes of excellent fastness to chlorine, light and washing are produced, can be prepared by reacting one mole of a diphenylsulfone containing at least one halogen atom, e. g., chlorine or bromine, with one or two moles of a dibenzanthrone containing from one to two amino or alkyl substituted amino groups, the hydrogen atoms of which replace one or two of the negative substituents of the diphenylsulfone by the dibenzanthroneimino group. The dyes obtained by the foregoing process are characterized by the following general formulae:

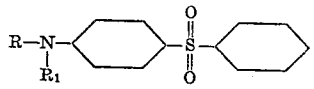

and

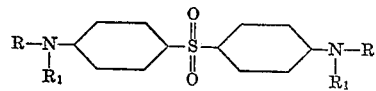

wherein R represents a dibenzanthrone radical and $R_1$ represents hydrogen or a lower alkyl group, e. g., methyl, ethyl, propyl, isopropyl or butyl group.

The condensation of the amino- or diaminodibenzanthrone with the halogenated diphenylsulfone is carried out in an organic solvent or diluting medium of high boiling point, such as, for example, nitrobenzene, trichlorobenzene, naphthalene, quinoline and the like. To this reaction mixture there is added an acid binding agent such as the alkali metal salts of weak acids, e. g., sodium or potassium carbonate, sodium or potassium acetate, or the oxides of alkaline earth metals and mixtures thereof, and a catalytic amount of metallic powdered copper or cupric chloride or cuprous chloride and iodine. The reaction mass is heated to 205–210° C. until all of the amino- or diamino-dibenzanthrone has reacted. The amount of solvent-diluent employed is not critical so long as it is sufficient to form a suspension of the diphenylsulfone, acid binding agent, copper and iodine catalyst. The amount used may range from 8 to 25 parts by weight per 1 part by weight of the amino- or diamino-dibenzanthrone employed. The proportions of acid binding agent or a mixture thereof may range from 0.5 to 1.5 parts by weight per 1 part by weight of the dibenzanthrone. As for the amount of copper, copper halide and iodine, a catalytic amount, is employed, which may range from 0.5 to 5.0 parts by weight per 1 or 2 molecular equivalents of the dibenzanthrone.

As examples of suitable halogenated diphenylsulfones, the following are illustrative:

4-bromodiphenylsulfone
4-chlorodiphenylsulfone
4,4'-dibromodiphenylsulfone
4,4'-dichlorodiphenylsulfone The following are suitable examples of amino and di-amino-dibenzanthrones including their derivatives and homologues in which only one hydrogen atom of the amino group is replaced by a lower alkyl radical such as, methyl, ethyl, propyl or butyl groups:

Amino-dibenzanthrone
N-methyl amino-dibenzanthrone
Amino-isodibenzanthrone
Amino-chlorodibenzanthrone
N-methyl amino-chlorodibenzanthrone
Diamino-chlorodibenzanthrone
Diamino-dichlorodibenzanthrone
Amino-dichlorodibenzanthrone
Diamino-dibenzanthrone
Diamino-isodibenzanthrone
Amino-chloro-isodibenzanthrone
Amino-dichlorobenzanthrone
N-methyl amino-isodibenzanthrone
N-methyl amino-chloroisodibenzanthrone In addition to the foregoing process steps, the condensation reaction can be carried out in the dry state in the absence of the high boiling solvent. There is added in this case an excess of acid binding agent which also acts as the diluent in the condensation which generally proceeds at a temperature of 200–250° C.

The reaction products dissolve in concentrated sulfuric acid usually to give reddish-violet to violet-blue solutions and dye vegetable fibers grey to black shades.

The reaction products where $R_1$ is alkyl can be prepared as above or alternatively the product where $R_1$ is hydrogen may be treated with alkylating agents to yield N-alkyl derivatives, for example N-methyl, N-ethyl derivatives, etc., of the dyestuffs.

The following examples will further illustrate the nature of said invention which however is not to be considered as being limitative thereof. The parts given are all by weight.

*Example I*

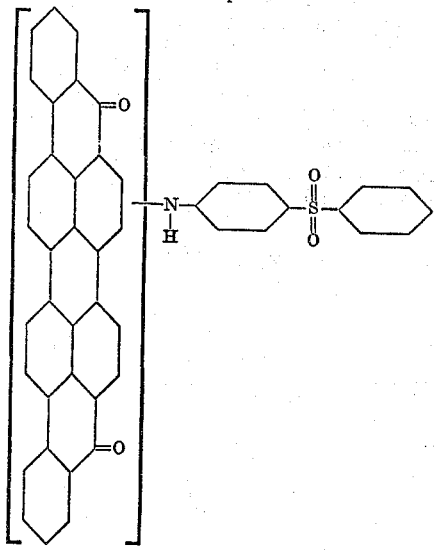

8 parts of amino-dibenzanthrone (prepared by direct nitration of dibenzanthrone) followed by reduction to the amino derivative are added to a suspension of 200 parts trichlorobenzene, 15 parts of 4-bromodiphenylsulfone, 8 parts soda ash, 5 parts anhydrous sodium acetate, ½ part copper and ½ part iodine.

The reaction mass is heated to 205–210° C. until all of the amino-dibenzanthrone has reacted. The dyestuff is isolated by filtration by suction or by distilling off the solvent, if desired with the aid of reduced pressure or of steam or both.

The dyestuff which is obtained in good yields is acid pasted in order to get it into proper physical form for dyeing. The black powder thus obtained dyes cotton blue-grey to black shades having good chlorine and wash fastness and fair light fastness.

Example II

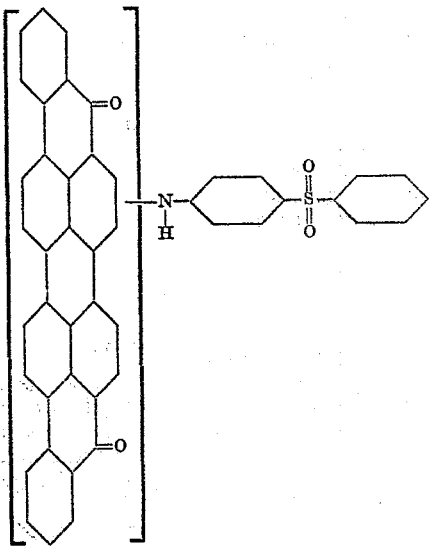

47.1 parts of amino-dibenzanthrone (prepared as described in Example I) are reacted with 29.7 parts 4-bromodiphenylsulfone in 500 parts of nitrobenzene in the presence of 32 parts of soda ash, 10 parts anhydrous sodium acetate, 2 parts copper and 2 parts iodine at 205–210° C. until all the amino-dibenzanthrone has been used up.

The dyestuff is isolated and acid pasted as described in Example I.

The dyestuff which is obtained in good yield is a black powder dyeing cotton blue-grey to black shades of good fastness properties.

Stronger tinctorial properties of this dyestuff can be obtained by treating the product isolated from the above condensation in 200 parts methanol and 312 parts potassium hydroxide flakes at a temperature of 150–155° C. for three hours. The melt is cooled, drowned in water, aerated and filtered neutral.

Example III

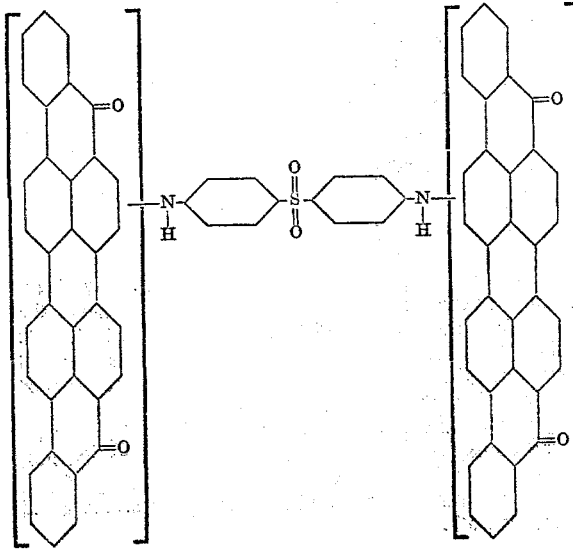

23.6 parts of amino-dibenzanthrone (prepared as described in Example I) are added to 350 parts of nitrobenzene. There are now added 9.4 parts 4,4'-dibromodiphenylsulfone, 16 parts of soda ash, 5 parts of anhydrous sodium acetate, 1 part copper and 1 part iodine.

The mixture is heated at 205–210° C. until all of the amino-dibenzanthrone has reacted.

The dyestuff which is obtained in good yield is a black powder which when acid pasted by known procedures dye cotton blue-grey shades of excellent chlorine and wash fastness.

Stronger tinctorial properties result when the above described product is subjected to an alcoholic-potassium hydroxide fusion similar to that treatment used in Example II.

Example IV

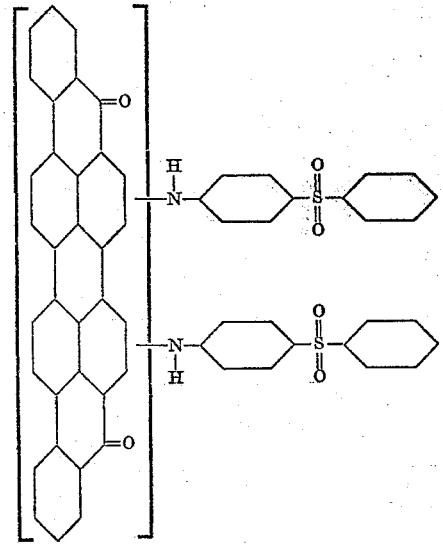

24.3 parts diamino-dibenzanthrone (prepared by direct nitration of dibenzanthrone in a mixture of monochloro and dichloracetic acid followed by reduction to the diamino derivative) is boiled in 400 parts of nitrobenzene with 29.7 parts of 4-bromodiphenylsulfone in the presence of 30 parts sodium acetate, 15 parts soda ash, 3 parts copper and 3 parts iodine at 205–210° C. until all the diamino-dibenzanthrone has reacted.

The product is isolated as described in Example I.

The dyestuff which is obtained in a good yield is a black powder which dyes cotton grey to black shades of good fastness properties.

Example V 24.3 parts diamino-dibenzanthrone (prepared as described in Example IV) is boiled in 400 parts of nitrobenzene with 18.0 parts of 4,4'-dibromodiphenylsulfone in the presence of 30 parts sodium acetate, 15 parts soda ash, 3 parts copper and 3 parts iodine at 205–210° C. until all the diamino-dibenzanthrone has reacted.

The mixture of products is isolated as described in Example I.

The black powder dyes cotton blue-grey to black shades possessing good fastness properties.

Example VI

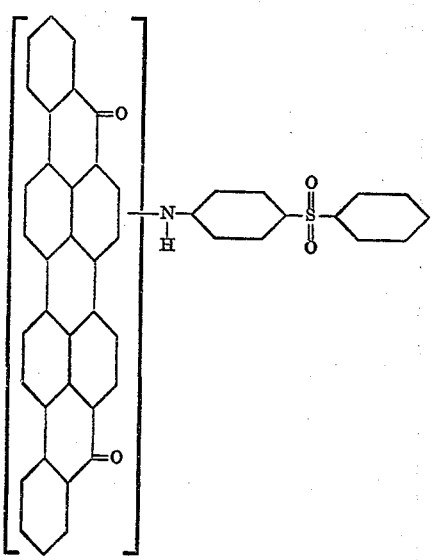

11.8 parts of amino-dibenzanthrone (prepared by mononitrating bz 1-bz 1'-dibenzanthronyl in sulfuric acid; reducing the nitro derivative and finally ring-closing the amino bz 1-bz 1'-dibenzanthronyl to the corresponding dibenzanthrone in alcoholic-KOH at 125–130° C.) is boiled in 200 parts nitrobenzene with 7.4 parts 4-bromodiphenylsulfone, 10 parts sodium acetate, 8 parts soda ash, 2 parts copper powder and 2 parts iodine at 205–210° C. until all the amino-dibenzanthrone has reacted.

The dyestuff which is obtained by the usual procedures is a black powder dyeing cotton fibers blue-grey to black shades possessing good fastness properties.

Example VII

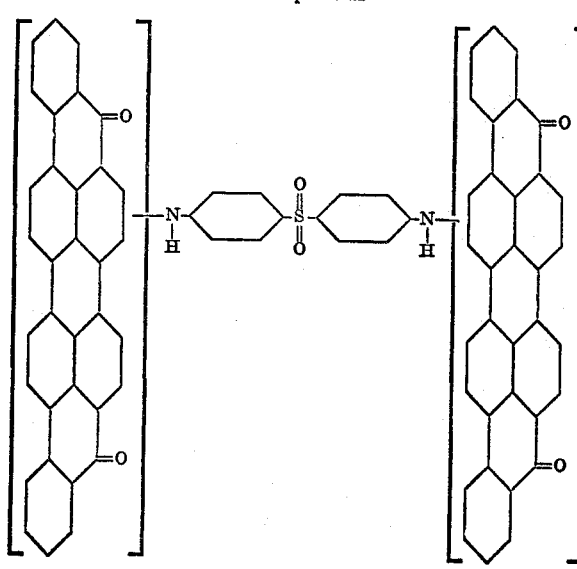

23.6 parts of amino-dibenzanthrone (prepared as described in Example 6) is boiled in 300 parts of nitrobenzene, 9.4 parts of 4,4'-dibromodiphenylsulfone, 10 parts sodium acetate, 10 parts soda ash, 2 parts copper powder, 2 parts iodine at 205–210° C. until all the amino-dibenzanthrone has reacted.

The dyestuff is isolated by well known methods. It is a black powder dyeing vegetable fibers grey to black shades of good fastness properties.

Example VIII

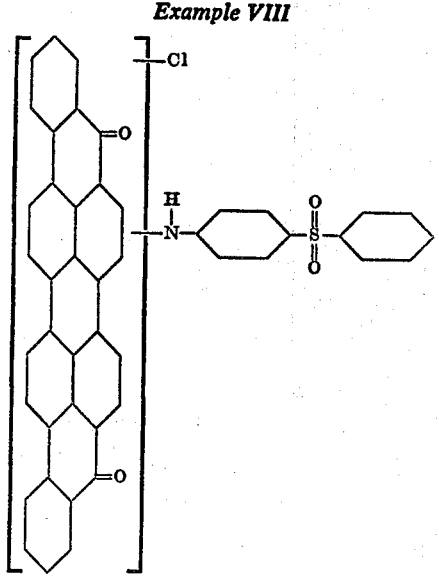

Example I was repeated with the exception that the amino-dibenzanthrone was replaced by 8.1 grams of amino- mono- chloro-dibenzanthrone.

The dyestuff is isolated by filtration or by suction or by distilling off the solvent, if desired with the aid of reduced pressure or of steam or both.

The black powder thus obtained dyes cotton grey to black shades of good fastness properties.

Example IX

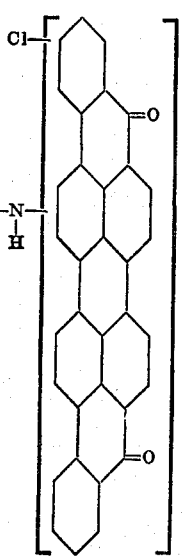

Example III was repeated with the exception that the amino-dibenzanthrone was replaced by 24 grams of amino- mono- chloro-dibenzanthrone.

The reaction was conducted as in Example III.

Example X

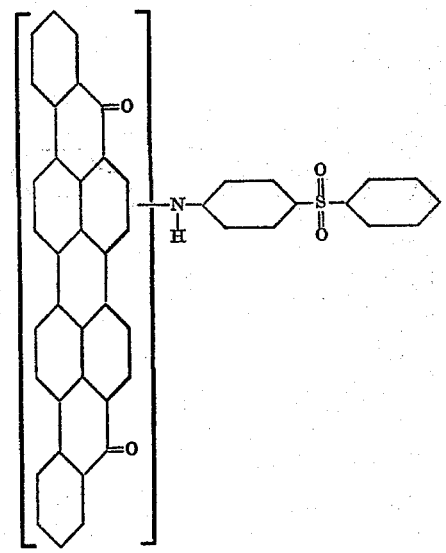

Example I was repeated with the exception that the amino-dibenzanthrone was replaced by 8.7 grams of amino- dichloro-dibenzanthrone.

The isolated product dyes vegetable fibers grey to black shades.

Example XI

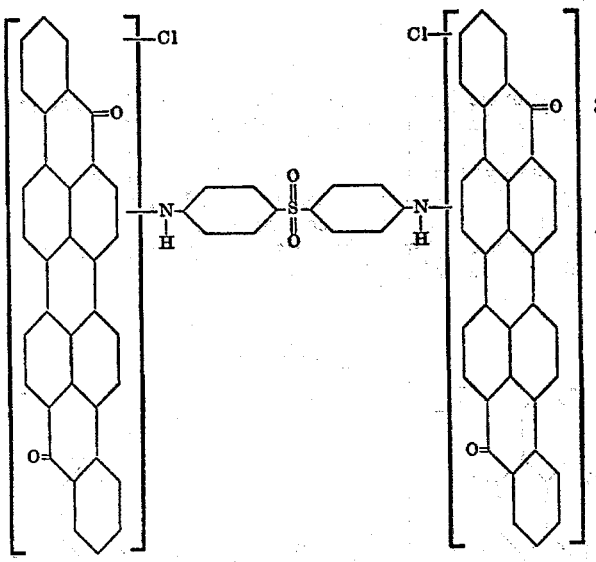

Example III was repeated with the exception that the amino-dibenzanthrone was replaced by 24 grams of amino- mono- chloro-isodibenzanthrone.

The isolated product dyes vegetable fibers grey to black shades.

We claim:

1. Vat grey to black dyes of the dibenzanthrone series selected from the class consisting of those having the following formulae:

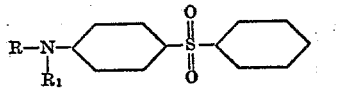

and

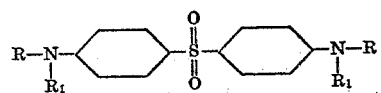

wherein R represents a radical selected from the group consisting of dibenzanthrone- and isodibenzanthrone radicals and $R_1$ represents a member selected from the group consisting of hydrogen and lower alkyl groups.

2. A black dye which dyes cotton blue-grey to black shades, characterized by the following formulae:

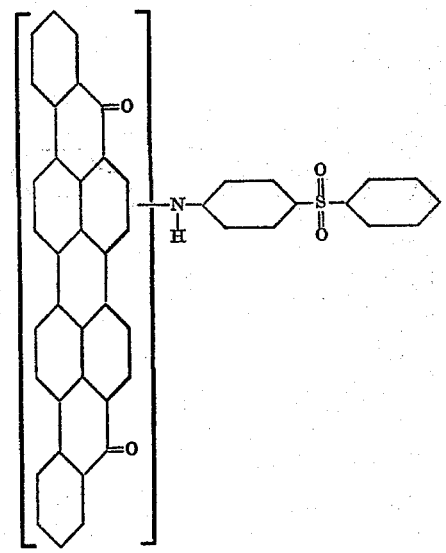

3. A black dye which dyes cotton blue-grey to black shades, characterized by the following formulae:

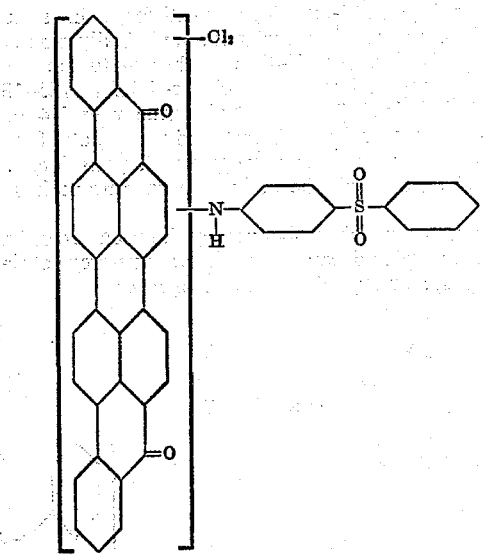

4. A black dye which dyes cotton blue-grey shades characterized by the following formulae:

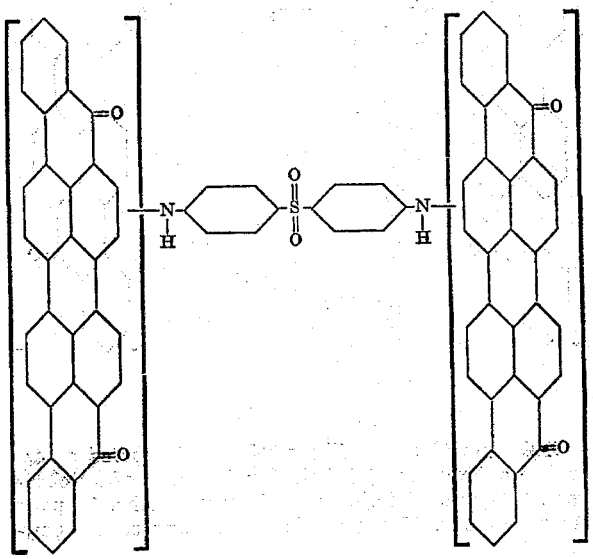

5. A black dye which dyes cotton grey to black shades characterized by the following formulae:

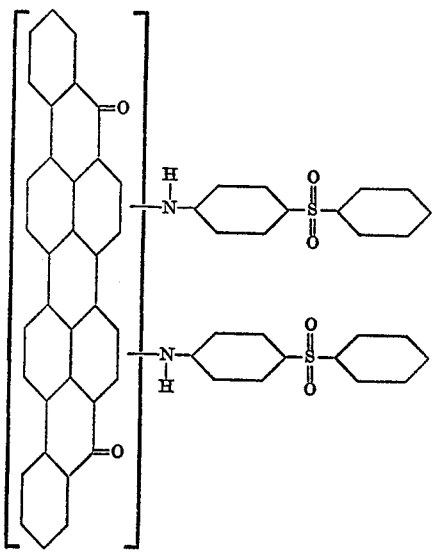

6. A black dye which dyes cotton blue-grey to black shades characterized by the following formulae:

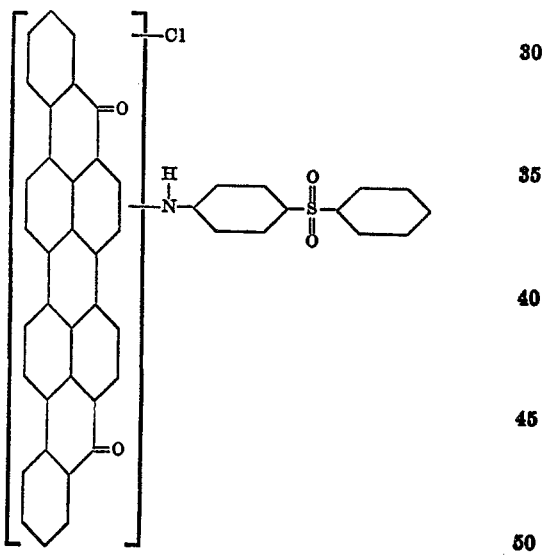

7. A process of preparing vat grey to black dyes of the dibenzanthrone series which comprises heating an amino-dibenzanthrone with a diphenyl sulfone containing at least 1 halogen atom at a temperature ranging from between 205–210° C. in the presence of an acid-fixing agent.

8. The process according to claim 7 wherein the amino-dibenzanthrone is monoamino-dibenzanthrone.

9. The process according to claim 7 wherein the amino-dibenzanthrone is amino-dichlorobenzanthrone.

10. The process according to claim 7 wherein the amino-dibenzanthrone is amino-monochlorodibenzanthrone.

11. The process according to claim 7 wherein the amino-dibenzanthrone is diamino-dibenzanthrone.

References Cited in the file of this patent

UNITED STATES PATENTS 1,759,272    Nawiasky _____ May 20, 1930